(12) United States Patent
Voytko et al.

(10) Patent No.: US 10,346,382 B1
(45) Date of Patent: Jul. 9, 2019

(54) SYSTEMS AND METHODS FOR COPYING AND PASTING SUGGESTION METADATA

(71) Applicant: Google Inc., Mountain View, CA (US)

(72) Inventors: Jacob Robert Voytko, New York, NY (US); Luiz Do Amaral De Franca Pereira Filho, Jersey City, NJ (US); Fil Zembowicz, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 556 days.

(21) Appl. No.: 14/598,819

(22) Filed: Jan. 16, 2015

(51) Int. Cl.
*G06F 16/23* (2019.01)

(52) U.S. Cl.
CPC .................................. *G06F 16/23* (2019.01)

(58) Field of Classification Search
None
See application file for complete search history.

(56) References Cited

U.S. PATENT DOCUMENTS

| | | | | |
|---|---|---|---|---|
| 8,589,349 B2 * | 11/2013 | Grant | .................. | G06F 17/2288 707/638 |
| 9,256,341 B2 * | 2/2016 | Megiddo | ................ | G06F 3/048 |
| 2005/0203935 A1 | 9/2005 | McArdle | | |
| 2009/0007267 A1 * | 1/2009 | Hoffmann | .............. | G06Q 10/00 726/22 |
| 2012/0072854 A1 * | 3/2012 | Zhou | ...................... | G06F 17/24 715/751 |

\* cited by examiner

*Primary Examiner* — Mark D Featherstone
*Assistant Examiner* — Ranjit P Doraiswamy
(74) *Attorney, Agent, or Firm* — Lowenstein Sandler LLP (57) ABSTRACT

Systems and methods are disclosed herein for modifying suggestion metadata in an electronic document. A copy request is received to copy a portion of the electronic document. The portion of the electronic document includes a first suggestion having metadata that indicates the suggestion was made by a first user. The copy request is received from a second user. A paste request to paste the copied portion is received from the second user. The metadata of the suggestion is modified based on the paste request to obtain modified metadata.

18 Claims, 8 Drawing Sheets

SYSTEMS AND METHODS FOR COPYING AND PASTING SUGGESTION METADATA

FIELD OF THE INVENTION

In general, this disclosure relates to electronic documents, in particular, to systems and methods for copying and pasting suggestion metadata.

BACKGROUND

During development of an electronic document, it is often desirable to have multiple users propose changes and comment on a draft of the electronic document. For example, an author may create an initial draft of an electronic document and send a copy of the electronic document to one or more reviewers to make comments or changes in the document. These changes and comments may be displayed in a markup manner in a view of the document, such that indications of the changes and comments are displayed in a margin of the view. When content from the document includes a comment or a change that was made by one user, and the content is copied and pasted by a different user, it is unclear how to manage and display the ownership of the pasted content.

SUMMARY

Systems and methods are disclosed herein for modifying suggestion metadata in an electronic document. According to one aspect, a copy request is received to copy a portion of the electronic document. The portion of the electronic document includes a first suggestion having metadata that indicates the suggestion was made by a first user. The copy request is received from a second user. A paste request to paste the copied portion is received from the second user. The metadata of the suggestion is modified based on the paste request to obtain modified metadata.

Another aspect relates to a system including means for receiving a copy request to copy a portion of the electronic document. The portion of the electronic document includes a first suggestion having metadata that indicates the suggestion was made by a first user. The system further comprises means for receiving a copy request from a second user, means for receiving a paste request to paste the copied portion, and means for modifying the metadata of the suggestion based on the paste request to obtain modified metadata.

In some implementations, the system further comprises means for creating a second suggestion having the modified metadata and means for pasting the second suggestion to a destination indicated in the paste request. The system may further comprise means for determining a destination indicated in the paste request, wherein the metadata of the suggestion is dependent on the destination. When the destination is in the electronic document, the metadata may be modified by adding an indication that the second suggestion is created by the second user. The modified metadata includes an indication that content of the suggestion was originally created by the first user.

In some implementations, the electronic document is a first electronic document, and when the destination is in a second electronic document having a same type as the first electronic document, the metadata is modified by replacing the indication that the suggestion was made by the first user with an indication that the suggestion was made by the second user. In some implementations, a first application is used to open the electronic document, and when the destination is in a second application that is different from the first application, the metadata is modified by removing the metadata. The system may further comprise means for pasting the portion of the electronic document to a destination indicated in the past request, wherein the pasted portion corresponds to the copied portion without the first suggestion. If the first suggestion is an addition, the system may further comprise means for accepting the first suggestion in the copied portion to obtain the pasted portion. Otherwise, if the first suggestion is a deletion, the system may further comprise rejecting the first suggestion in the copied portion to obtain the pasted portion.

BRIEF DESCRIPTION OF THE DRAWINGS

The above and other features of the present disclosure, including its nature and its various advantages, will be more apparent upon consideration of the following detailed description, taken in conjunction with the accompanying drawings in which.

DETAILED DESCRIPTION

To provide an overall understanding of the disclosure, certain illustrative embodiments will now be described, including a system for copying and pasting suggestion metadata in a document editor. In particular, copying and pasting suggestion metadata in a document editor allows for content in a document to be copied and pasted without creating attribution problems when the content includes suggested changes. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
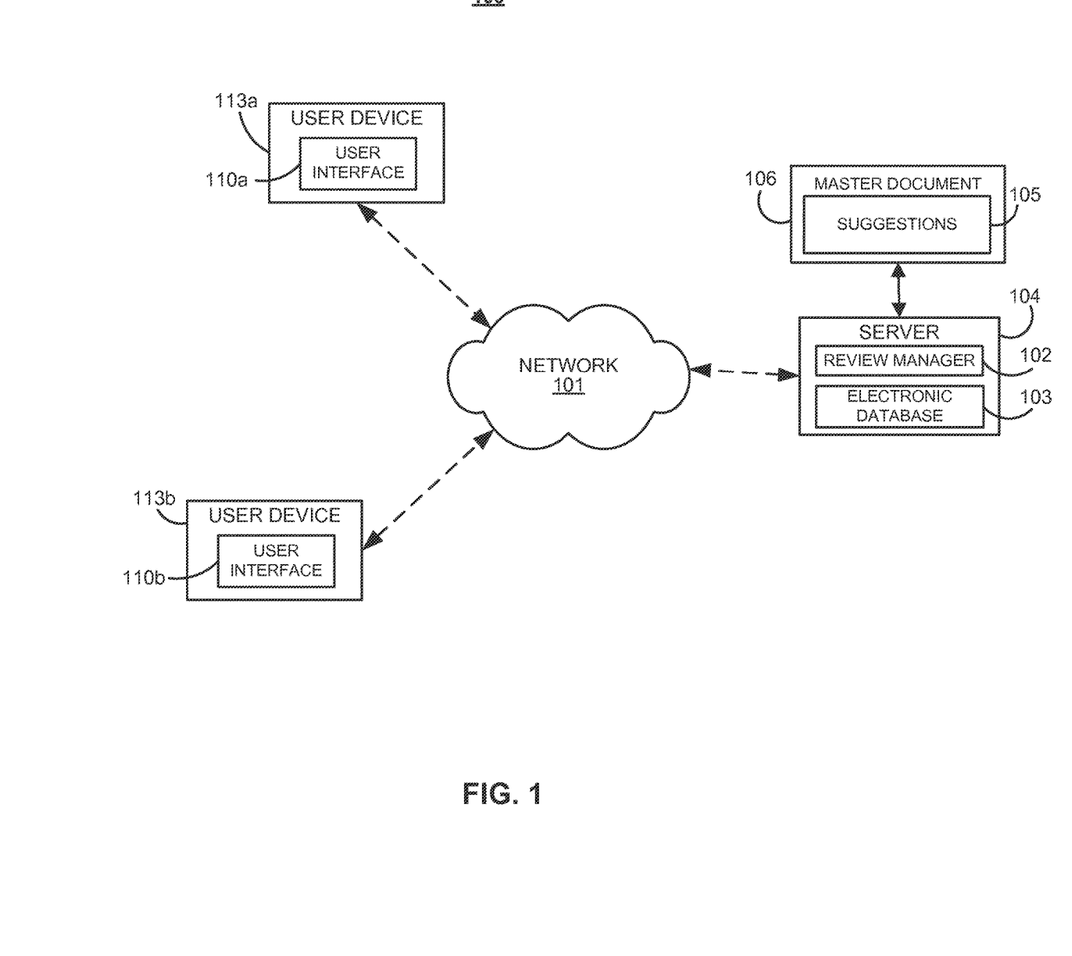
FIG. 1 is a block diagram of a computerized system for managing suggestions in an electronic document, according to an illustrative embodiment.
Figure 2:
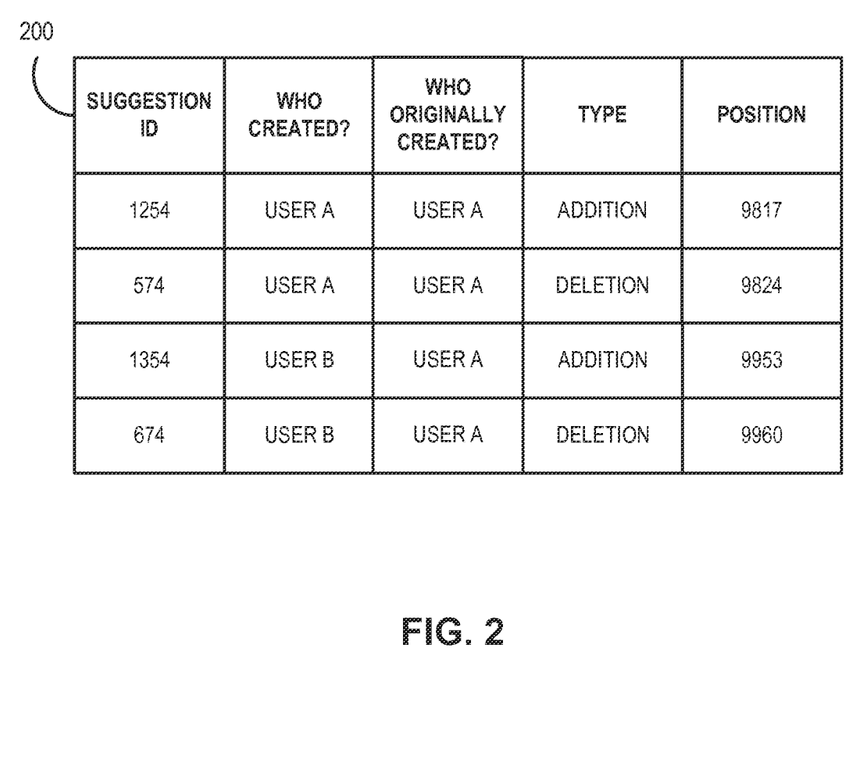
FIG. 2 is an example data structure stored on an electronic database that includes a list of suggestions to an electronic document, according to an illustrative embodiment.

FIGS. 1 and 2 are diagrams of a network and a database structure that may be used to implement the systems and methods disclosed herein. FIG. 1 is a block diagram of a computerized system 100 for copying and pasting suggestion metadata in an electronic document, according to an illustrative embodiment. The system 100 includes a server 104 and two user devices 113a and 113b (generally, user device 113) connected over a network 101. The server 104 includes a review manager 102, which manages updates to various versions of a master document 106.

The review manager 102 is configured to transmit and receive data over the network 101 in communication with the user devices 113. In particular, the review manager 102 receives data indicative of changes that a user at a user device 113 wishes to suggest or create related to a portion of the master document 106. These changes may correspond to edits to the document (such as additions, deletions, or format changes, for example), or these changes may correspond to comments (or replies to comments) that reflect the user's thoughts on a portion of the master document 106. Depending on the user type, which sets the access permissions for the user to access the master document 106, the review manager 102 then creates these changes by appending to a list of suggestions 105 corresponding to the master document 106. The list of suggestions 105 may be stored in the form of a data structure, an example of which is described in more detail in relation to FIG. 2.

The review manager 102 may include a processor and a memory unit. The memory unit stores computer executable instructions, which are executed by the processor. The computer executable instructions include instructions for receiving data over the network 101, determining a user type for a given user, making changes in the master document 106, and publishing various versions of the document 106 to various users. As depicted in FIG. 1, the master document 106 is stored on a separate device from the server 104, but the master document 106 may also be stored in the electronic database 103 or even in a memory unit included within the review manager 102. In addition, any data described herein as being stored on the electronic database 103 may instead or additionally be stored in a memory unit in the review manager 102 or on a separate memory unit external to the server 104.

Users at user devices 113 may simultaneously interact with the master document 106 over user interfaces 110a and 110b (generally, user interface 110). In particular, FIG. 1 depicts two user devices 113, and the users at the two user devices 113 may be associated with a user type defining a level of authority for access to and editing capabilities of certain versions of the master document. Each user device 113 may include a device such as a personal computer, a laptop computer, a tablet, a smart phone, a personal digital assistant, or any other suitable type of computer of communication device. Users at the user devices access and receive information from the server 104 over the network 101. The user devices 113 may include typical components, for example, an input device, an output device, and a communication interface. A user may authenticate with the server 104 by inputting a user name and password (or providing other identification information) via a user interface, such that the same user device may be used by different users at different times, including users with the same or different user type.

Users interact with the server 104 such that the users, in conjunction with the server 104, generate an online document by collaboratively proposing changes and commenting in the document 106. Although illustrated as a single device in FIG. 1, the server 104 may be implemented as, for example, a single computing device or as multiple distributed computing devices. The interaction of users with the server 104 is through the user interfaces 110, which may include web browsers. For example, the document may be viewed with an application that displays the document within a web browser. In this arrangement, users do not need to install software locally to their user devices to view and make changes in the document. When browsers or user interfaces are discussed herein, these terms are intended to refer to any program that allows a user to browse documents, regardless of whether the browser program is a standalone program or an embedded program, such as a browser program included as part of an operating system. The logic described herein can be implemented in hardware, software, firmware, or a combination thereof.

The users provide suggested changes or comments to the document 106. These suggested changes or comments are referred to herein as "suggestions," which may include any change that is made to a corresponding portion of the content of a document or a comment on a corresponding portion of a document. Indications of these suggestions may be displayed on a marginal sidebar displayed adjacent to a view of the document on the user interfaces 110. These indications are referred to herein as "metadata regions," which are shown and described in detail in relation to FIGS. 3-5. The metadata regions may include information regarding the suggestions, such as the user who created the suggestion, the time the suggestion was created, the type of suggestion, the substance of the suggestion, or any suitable combination thereof.

The review manager monitors inputs from the user devices 113a and 113b to update the master document 106 and the corresponding list of suggestions 105. In particular, the review manager 102 may be configured to detect that a copy command was received for a section of the document that includes a suggestion made by a first user that is different from a second user who issues the copy command. In response to detecting this situation, the review manager 102 may copy the metadata of the original suggestion and may create a new suggestion into which to paste the metadata of the original suggestion. In particular, when the copy command is received, the review manager 102 may create a number of duplicates of the original suggestion (including the metadata of the original suggestion), one duplicate for each supported type of destination. Each duplicate of the suggestion may include its own version of the metadata, which may originally correspond to the metadata of the original suggestion. Examples of supported types of destination may refer to a destination that is within the same document, a destination that is within a different document of the same type as the original document, a destination that is within a different application than the application used to open the original document, or any other suitable destination of copied content. When the section is pasted, one of the duplicates may be assigned a suggestion identifier number to create a new suggestion. The metadata of the original suggestion is pasted into the new suggestion, which not only preserves the metadata of the original suggestion (which indicates that the suggestion was made by the first user), but also creates new metadata that indicates that the copy/paste command was made by the second user. By copying and pasting the suggestion metadata in this way, the systems and methods of the present disclosure avoid the attribution problems that arise when the system is unable to handle more than one user being associated with a suggestion.

When the interfaces 110 include web browsers, different versions of the document (for example, a markup version, a clean version, or various historical versions of the document, such as those including a selected group of the suggested and/or accepted edits) may be saved to different network locations. An editor may select which versions of the master document 106 are saved to which network location, and may further select to display a version of the document in a particular format, such as in browser format, html format, or any other suitable format for displaying an electronic document. In addition, a user may select to view the master document 106 including any suggested edit satisfying one or more criteria. As an example, a user may wish to view only suggested edits of a certain type, such as insertions, deletions, replacements, format changes, spelling mistakes, or any other suitable type of suggested edit. A user may view who else is currently viewing the document. When more than one user views the document at a time, the users may communicate with each other over an instant messaging application.

In an example, the document 106 is a text document. One of skill in the art will understand that the features and concepts described herein may be applied in any type of collaborative document application, including, for example, spreadsheet applications, presentation applications, drawing applications, and others. Moreover, regardless of the type of document, it will be understood that the content that is described herein as being copied and/or pasted may include textual content, image content, data content, video content, any other suitable content that may be copied or pasted, or any suitable combination thereof.

In certain implementations, each user of the electronic document 106 is associated with a user type. One type of document user is a reviewer, who has certain authority and access to the document. Typically a reviewer may view and make suggested edits and comments on the document 106, but may not accept or reject any of the suggested edits or delete any of the comments made by other users. Another user type is an editor, who has a greater level of authority (i.e., a larger set of permissions) for the document 106 than the reviewer. The editor can accept or reject any suggested edits made by the reviewer, and further can delete any comments made by the reviewer. In addition to accepting or rejecting changes made by the reviewer, the editor also has access to make direct changes to the document by directly editing or to make comments on the document 106. The review manager 102 generally treats edits made by the editor as accepted edits which are automatically accepted. Alternatively, the editor may wish to make a suggested edit in order to get input from the reviewer or other editors regarding the suggested edit. In this case, the editor may mark an edit as "suggested" or may set the user device 109 to operate in "reviewer mode," such that the suggested edit appears in the list of annotations 105 of the document to the reviewer. Access and authority may vary and be customized for a document allowing different access and use capabilities for different users.

The updates to the master document 106 and the list of suggestions 105 may be performed nearly in real-time. This means that when a reviewer and an editor are simultaneously viewing and accessing the document, the reviewer receives feedback regarding a suggested edit almost immediately after the editor sends the feedback. Two user devices 113 are shown in FIG. 1 to avoid complicating the drawing; however the system 100 can support any number of users with the same or different user type.

As shown in FIG. 1, the user devices 113 access the master document 106 via the server 104. While the copying and pasting of suggestion metadata may be used in the collaborative online document editing environment that is depicted in FIG. 1, one of ordinary skill in the art will understand that the systems and methods of the present disclosure may be implemented in local document editing environments. In the local document editing environment, the master document 106 may be stored directly on a local device, such as the user device 113a, which allows a first user at the user device 113a to directly make suggestions to the document. The first user at the user device 113a may transmit the document to a second user at the user device 113b (such as over the network 101 or by another mode, for example). If the second user copies a portion of the document that includes a suggestion made by the first user, the user device 113b may include the functionality of the review manager 102. In particular, the user device 113b may be configured to detect when a user who issues a copy/paste command of a section in the document is different from a user who created a suggestion within the section. The user device 113b may copy and paste the suggestion metadata of the original suggestion into a new suggestion such that the original suggestion metadata is preserved. The new suggestion may further include an indication of the user who issued the copy/paste command in the new suggestion's metadata.

In certain implementations, each user may be assigned a unique color, such that the changes of a version of the document are color-coded by the user who made the changes. In addition, changes made by editors may be marked differently on view of the document from changes made by reviewers. When displayed in a marginal sidebar in a display of the document, the annotations that are made by individual users may be marked with the user's color. For a suggestion (that was originally created by a first user) that is copied and pasted to another portion of the same document by a second user, the annotation may be marked with the second user's color, with an indication of the first user's color within the annotation to indicate that the first user originally created the suggestion.

FIG. 2 depicts an exemplary data structure 200 that may be stored on the electronic database 103 that includes metadata corresponding to suggestions, according to an illustrative embodiment. The data structure 200 includes four records of suggestions. Each record in the data structure 200 includes a "suggestion id" field whose values include identification numbers for the suggestions. Each record in the data structure 200 corresponds to a suggested edit or a comment that is made by a user. Each record further includes the user id of the user who created the suggestion, the user id of the user who originally created the suggestion, a type associated with the suggestion (i.e., addition, deletion, move, replacement, format changes, spelling changes, comment, or any other suitable type of suggestion), and a position identifier that indicates a position of the suggestion in the electronic document 106.

In general, the position identifier may be any suitable identifier, such as a pointer to a location in the document, an address that stores such a pointer, or any other suitable way of referring to a position in a document. As shown in FIG. 2, the position identifier is a four digit number, which may correspond to distinct locations within the electronic document 106. In general, the position identifier may include a range of positions, such that the position identifier is indicative of a length of the range of a section of the document that is modified by the suggestion. The length of the suggestion may refer to a number of characters or words that are being added, replaced, deleted, or commented on. The data structure 200 indicates that user A created the suggestion 1254, which is an addition that is made at a position slightly before the position of the suggestion 574, which is a deletion that is also created by user A.

User B copies a section of the document that includes the suggestions 1254 and 574. If the user B pastes the copied section into a destination within the same document, two new suggestions 1354 and 674 are created and stored in the data structure 200. The new suggestion 1354 is essentially a copy of the original suggestion 1254 because it includes metadata indicating that user A originally created the suggestion and that it is an addition. However, the metadata for the new suggestion 1354 is slightly modified from the original metadata for the original suggestion 1254 because the new suggestion 1354 was created by user B and references a different position than the original suggestion 1254. The position of suggestion 1354 refers to the placement of suggestion 1354 after the selected section was pasted into the document. Similarly, the new suggestion 674 is essentially a copy of the original suggestion 574, with modifications to the metadata of the original suggestion 574. In particular, like the original suggestion 574, the new suggestion 674 was originally created by user A and represents a deletion. In addition, the modified metadata of the new suggestion 674 indicates that it was created by user B and has a different position than the original suggestion 574. An example process for modifying the suggestion metadata is described in detail in relation to FIGS. 4 and 7.

If user B pastes the copied section of the original document into a second document that has the same type as the original document, a different data structure may be used. In particular, each document has its own access control list, and user A may not have access to the second document. In this case, it may be undesirable to use the data structure of 200, which preserves the indication that user A originally created the copied suggestions. Doing this could give the appearance that user A had access to the second document when user A did not actually have access. To avoid this situation, the metadata of the copied suggestions may be modified to indicate that user B (i.e., the user who copied and pasted the suggestions) is the original creator of the suggestions when user B copies a section including suggestions into a different document. An example process for copying a section of a document into a different document is described in detail in relation to FIGS. 5 and 8.

If user B pastes the copied section of the document into an application that is different from the original application used to open the document, the copied suggestion metadata shown in FIG. 2 may be discarded. In the above example where user B copied the content into a second document of the same type as the original document, it is understood the second document is capable of handling suggestion metadata because the second document has the same type as the original document, which can handle suggestion metadata. However, it is understood that most applications may not be able to handle suggestion metadata, so it may be desirable to remove the indications of the suggestions when the copied section is pasted into a different application. Moreover, it may be desirable to avoid possible loss of information when the section is pasted. To avoid loss of data, any suggestions corresponding to additions may be accepted, and any suggestions corresponding to deletions may be rejected. An example process for copying a section of a document into a different application is described in detail in relation to FIGS. 6 and 8.

The data structure 200 is shown for illustrative purposes only, and other fields with additional data may also be included. Examples of such additional data include a timestamp associated with when the suggestion was created, when the content of the suggestion was originally created, whether the suggested edit was accepted or rejected, who accepted or rejected the suggested edit, and the time of the acceptance or rejection. Furthermore, when a suggested edit includes deleting, moving, or replacing existing objects in the document, the data structure 200 may further include which objects to delete, move, or replace. Similarly, when a suggested edit includes adding objects, the data structure 200 may further include which object(s) to add. As is shown in FIG. 2, the data structure 200 only saves the user id of the person who most recently moved or copied the content and the original author. In general, if the portion of the document is copied and pasted multiple times within the document, any number of intermediate users may also be saved as metadata in the data structure 200. However, to avoid complicating the metadata and storing unnecessary data, it may be desirable to only store indications of the original author and the most recent user (i.e., the user who most recently pasted the document portion) as metadata in the data structure 200.

The data structure 200 and the master document 106 may be stored on the same electronic database 103, or may be stored on different databases. In some embodiments, an original version of the master document 106 is stored on a database. For example, the combination of the original version and data structure 200 would be enough to generate versions of the document using a dynamic approach. In particular, if a user wishes to view only a subset of the suggested edits, a version of the document may be generated including the original version and the subset of suggested edits. The subset may include those suggested edits corresponding to a specific user, a user type, or an edit type. The generated version may not be stored on a database. Instead, when a user accesses the document, a version specific to that user (based on the user's settings) may be generated. In addition to the data stored in the example data structure 200, the review manager 102 may also store additional data. For example, data indicative of how all users interact with the document may be stored such as what portions of the document are most viewed or read.

Figure 3:
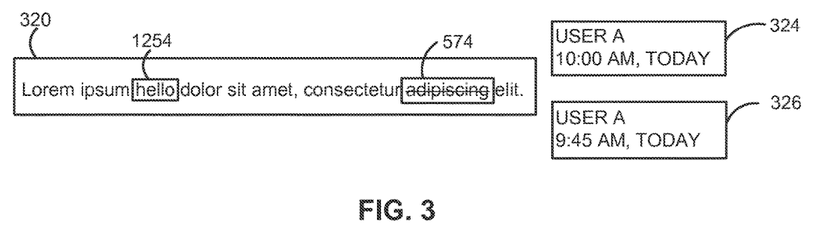
FIG. 3 is a diagram of an exemplary display of a user interface for interacting with a document having a sentence with suggestions, where the sentence is copied, according to an illustrative embodiment.
Figure 4:
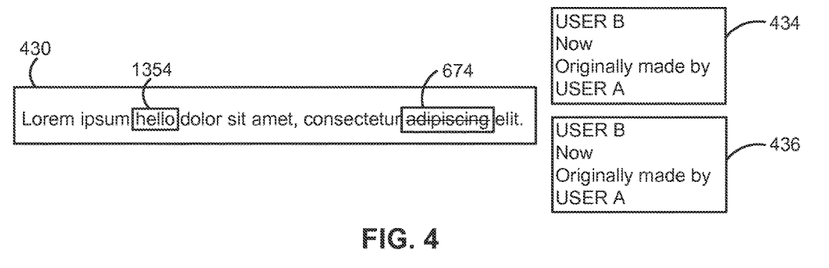
FIG. 4 is a diagram of an exemplary display of a user interface for interacting with a document having a pasted sentence with suggestions that is copied from the same document, according to an illustrative embodiment.
Figure 5:
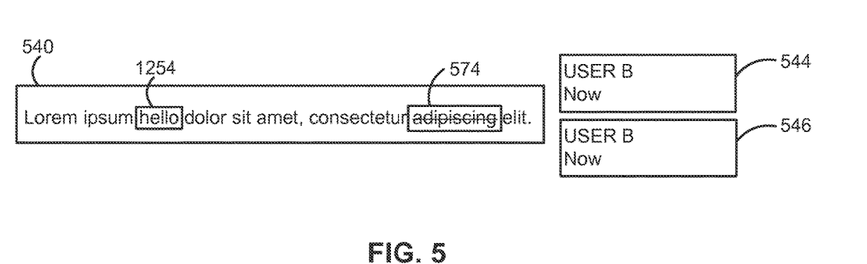
FIG. 5 is a diagram of an exemplary display of a user interface for interacting with a document having a pasted sentence with suggestions that is copied from a different document, according to an illustrative embodiment.
Figure 6:
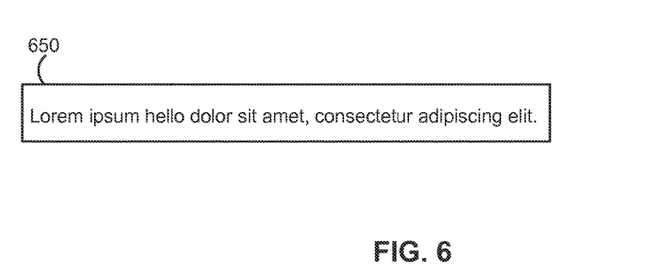
FIG. 6 is a diagram of an exemplary display of a user interface for interacting with a document having a pasted sentence that is copied from a different application, according to an illustrative embodiment.

FIGS. 3-6 are diagrams of exemplary portions of a display of a user interface for users interacting with the master document 106. In particular, FIG. 3 is an exemplary display 320 of a user interface that shows the two suggestions 1254 and 574, which are an addition and a deletion, respectively, of two words in a sentence. Moreover, to the right of the display 320, two metadata regions 324 and 326 are displayed. Each metadata region corresponds to one of the suggestions 1254 or 574 and display data indicative of who created the corresponding suggestion and the time and date the suggestion was made. The metadata shown in the metadata regions 324 and 326 may be stored in a data structure such as the data structure 200 shown in FIG. 2. FIG. 3 shows an example display of the user interface after user A has created the two suggestions 1254 and 574. After the user A created the two suggestions 1254 and 574, another user (user B, for example) provides a copy command to copy the content of the document shown in the display 320. As was described in relation to FIG. 2, the suggestion metadata may be modified differently, depending on where the content is pasted. FIGS. 4-6 show example displays of the pasted content. In particular, FIG. 4 shows an example display when the copied content is pasted into the same document, FIG. 5 shows an example display when the copied content is pasted into a different document of the same type as the original document, and FIG. 6 shows an example display when the content is pasted into a different application than the application used to open the original document.

FIG. 4 is an exemplary display 430 of a user interface that shows the copied and pasted content when the content is pasted into a different region of the same document as the original content that is copied. The data structure 200 of FIG. 2 may be used to store the metadata associated with the two new suggestions 1354 and 674 in the display 430. Moreover, the metadata regions 434 and 436 correspond to the new suggestions 1354 and 674, respectively, and provide metadata that is shown in FIG. 2. In particular, the new suggestion 1354 is essentially a copy of the original suggestion 1254, except that the new suggestion 1354 further includes metadata that indicates that user B created the suggestion 1354. The metadata region 434 provides an indication that user B created the suggestion 1354, even though user A originally created the content behind the suggestion 1354. The new suggestion 674 is created in a similar manner based on the original suggestion 574.

The example implementation shown in FIG. 4 may be desirable to avoid a situation in which credit for a suggestion is improperly given to the wrong user. In particular, since user A created the original content behind the original suggestion, user A should be credited with contributing to the suggestion when it is copied and pasted. Moreover, it is understood that if user A created the suggestions 1254 and 574 of FIG. 2, then user A has access to the current document. Thus, the potential conflict that arises when the content is pasted into a second document to which user A does not have access is not relevant to this example. For these reasons, the original suggestion metadata is modified to reflect that the new user (user B) created the new suggestion, while preserving the indication that the previous user (user A) created the content behind the new suggestion.

FIG. 5 is an exemplary display 540 of a user interface that shows the copied and pasted content when the content is pasted into a second document that is of the same type as the original document. Since user A may not have access to the second document, it may be undesirable to use the format shown in FIGS. 2 and 4, in which the new suggestion's metadata credits user A with originally creating the content behind the suggestion. To avoid this situation while adhering to a simple model, the original suggestion's metadata may be modified to reflect that user B originally created the content behind the new suggestion, such as is shown in FIG. 5. In particular, the new suggestions 1454 and 774 have the same content as the original suggestions 1254 and 574, but the metadata regions 544 and 546 indicate that user B created these suggestions. The reference to the original author of the suggestion (user A) is removed from the metadata regions 544 and 546.

In some implementations, the access control list of the second document may be checked to determine whether user A has access to the second document. If so, then the original suggestion metadata may be modified in the manner shown and described in relation to FIGS. 2 and 4, since preserving the metadata indicating that user A created the original suggestion does not give rise to a potential conflict with the access control list. Otherwise, if it is determined that user A does not have access to the second document, then the suggestion metadata may be modified in the manner shown and described in relation to FIG. 5, in which user B is credited with originally creating the content behind the new suggestion.

FIG. 6 is an exemplary display 650 of a user interface that shows the copied and pasted content when the content is pasted into a second application that is different than the application used to open the original document. In particular, the display 650 shows no indication of any suggestions within the pasted content. This is because not all applications are equipped to handle suggestion metadata or display content with suggestions. To keep the implementation simple, when copied content is pasted into a different application, the suggestion metadata may discarded or not used for the pasted content.

In some implementations, it is determined whether the second application is capable of handling suggestion metadata. If so, the pasted content may include the suggestions. Otherwise, the suggestions are removed from the content before it is pasted. In some implementations, it is desirable to avoid possible loss of information when content is pasted into the second application. To avoid loss of data, any suggestions corresponding to additions may be accepted, and any suggestions corresponding to deletions may be rejected. In particular, as is shown in FIG. 6, the suggestion 1254 was accepted because it corresponds to an addition, and the suggestion 574 was rejected because it corresponds to a deletion. In this manner, none of the information data is lost when the content is copied and pasted. However, such an implementation could lead to confusing content, such as words or sentences that are nonsensical. In particular, a word for which a suggestion included a spelling correction would include any deleted letters as well as any added letters. For a spelling correction that involves deleting at least one letter or replacing at least one letter, this implementation could result in a nonsensical word being pasted in the second application. Thus, there is a tradeoff between a desire to preserve information when content is pasted and a desire for the pasted content to be clear.

FIGS. 3-6 are exemplary displays of user interfaces and are shown for illustrative purposes only. In particular, one of ordinary skill in the art will appreciate any combination of metadata associated with annotations may be displayed in any number of ways on the user interface. For example, the metadata regions may include the text to be added or deleted or a portion thereof. When a user selects, via user input (such as with a mouse click or with keyboard input), a region surrounding a portion of the document, such as the suggestion 1254 in FIG. 3, the corresponding metadata region and/or the suggested edit may be highlighted with color or distinguished in any other way from a remainder of the display of the document.

The displays of FIGS. 3-6 only show portions of the document. These portions of the document may be distinguished from other portions of the document by the presence of a box around the relevant portions. In general, any method of distinguishing these portions of the document from a remainder of the document may be used, including using different colors for different users, different colors for different types of edits, underlining added items, striking out removed items, redlining the view of the document, or any other suitable method of distinguishing annotations in a document.

In some implementations, the users of a document are each assigned a color. Instead of boxes with different line types surrounding the portions of the document that correspond to the suggestions (such as is shown in the examples of FIGS. 3-5), the corresponding portions of the document may be highlighted or otherwise indicated with the user's particular color. The corresponding metadata regions may be indicated with the same color, and there may be lines connecting the portions of the document with the corresponding metadata regions.

Figure 7:
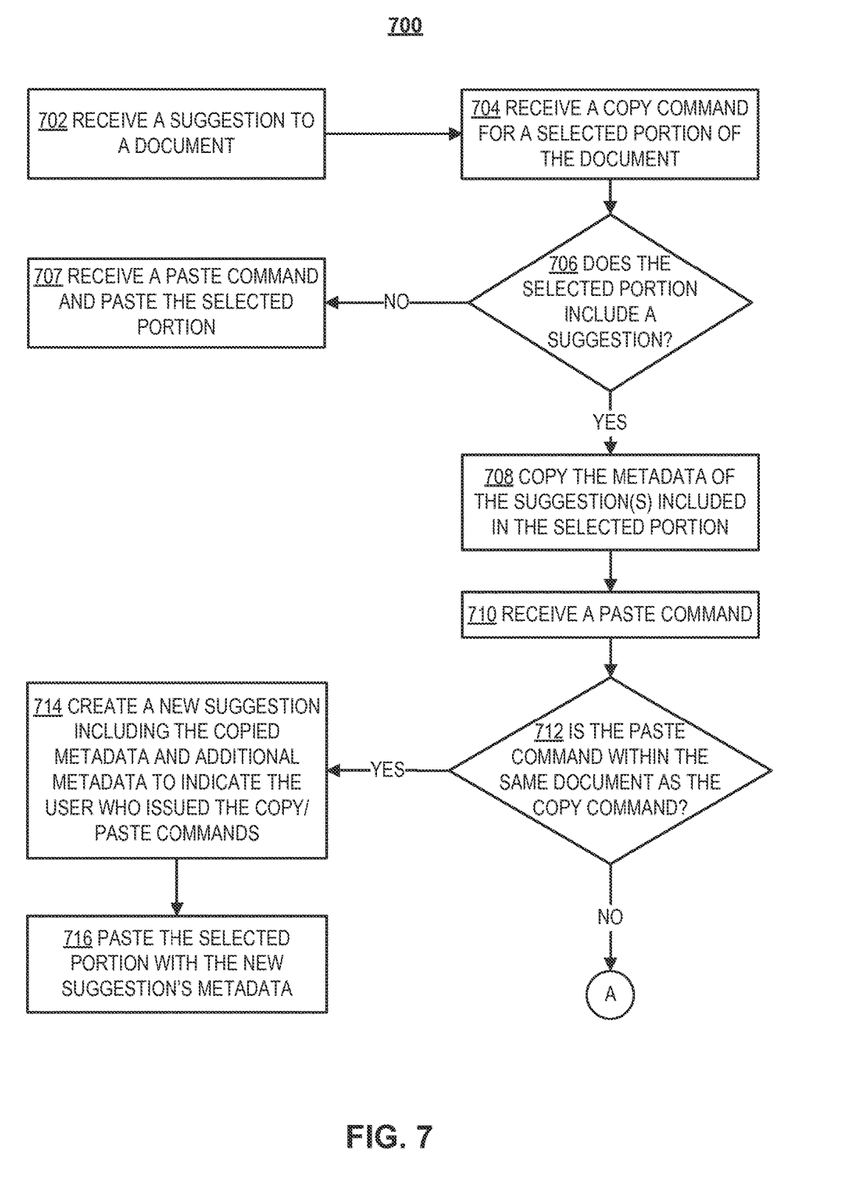
FIG. 7 is a flowchart of a method used by a review manager to manage suggestion metadata to a document when the document's content is pasted into the same document, according to an illustrative embodiment.

FIG. 7 is an illustrative flow diagram of a process 700 used by the review manager 102 to manage suggestions 105 to a document 106. The process 700 includes the steps of receiving a suggestion to a document (step 702), receiving a copy command for a selected portion of the document from a first user (step 704), and determining whether the selected portion includes a suggestion (decision block 706). If not, the selected portion is pasted when the paste command is received (step 707). Otherwise, the metadata of the suggestion(s) included in the selected portion is copied (step 708), and a paste command is received (step 710). If the paste command is within the same document as the copy command (decision block 712), a new suggestion is created that includes the copied metadata and additional metadata to indicate the user who issued the copy and paste commands (step 714), and the selected portion is pasted with the new suggestion's metadata (step 716). Otherwise, if the paste command is not within the same document as the copy command, the process 700 proceeds to the process 800 shown in FIG. 8.

At step 702, a suggestion is received to a document. In particular, the suggestion may be made by a first user, and may include a suggested change to the document, such as an addition of content, a deletion of content, a format change, a comment to a portion of the document, or any other suitable change to a document. At step 704, a copy command is received for a selected portion of the document. The copy command may be made by the same user as the first user or a different user.

At decision block 706, it is determined whether the selected portion (requested to be copied at step 704) includes a suggestion. The selected portion includes a suggestion if any suggestion refers to a part or the whole of the selected portion. For example, referring back to FIG. 3, the selected portion may correspond to the entire sentence shown in the display 320. In this case, the selected portion includes two suggestions 1254 and 574. In some implementations, a selected portion that includes a fragment or a part of a suggestion (e.g., if the selected portion is "Lorem ipsum hel" of the sentence shown in FIG. 3) is said to include a suggestion at decision block 706. If the selected portion does not include a suggestion, a paste command is received, and the selected portion is pasted into a destination indicated by the paste command at step 707.

Otherwise, if the selected portion includes one or more suggestions (including a fragment of a suggestion), the process proceeds to step 708 to copy the metadata of the suggestion or suggestions that are included in the selected portion. In particular, examples of the metadata are shown and described in relation to FIG. 2, and may include a user identifier of a user who originally created the content of the suggestion, the type of suggestion, the position of the suggestion within the document, the time at which the suggestion was made, or any other suitable metadata related to a suggestion. When the selected portion of the document that is copied includes a fragment of an original suggestion, the copied metadata corresponds to the metadata associated with the fragment. For example, the user may select to copy the portion "Lorem ipsum hel" of the sentence shown in FIG. 3. Because the entire suggestion 1254 is not copied, the suggestion metadata that is copied in this case would be data regarding the addition of "hel" by the user A. In general, the metadata is copied so that it can be saved as the metadata for a new suggestion that may be created in response to a paste command that is received at step 710. As described above, the paste command includes a destination for the copied portion, and the manner in which the copied metadata is used for the pasted content may depend on the destination in the paste command.

At decision block 712, it is determined whether the paste command has a destination that is within the same document as the copy command. If the destination is within the same document as the source of the copied content, a new suggestion is created at step 714. The new suggestion includes the metadata that was copied at step 708 and additional metadata to indicate the user who issued the copy and paste commands at steps 704 and 710, respectively. As an example, the new suggestions 1354 and 674 shown in the data structure 200 of FIG. 2 may be created, and the metadata from the original suggestions 1254 and 574 may be modified to indicate that user B created the new suggestions 1354 and 574. Moreover, the metadata may be further modified to update a timestamp associated with the new suggestion. The timestamp may correspond to the time at which the paste command was made at step 710, when the copy command was made at step 704, or a combination of both. At step 716, the selected portion is pasted into the destination, where the pasted content includes the new suggestion and the new suggestion's metadata. An example of pasted content that includes the new suggestion and its metadata is shown and described in relation to FIG. 4. Otherwise, if the paste command's destination is not within the same document as the copy command at decision block 712, the process 700 proceeds to the process 800 of FIG. 8.

Figure 8:
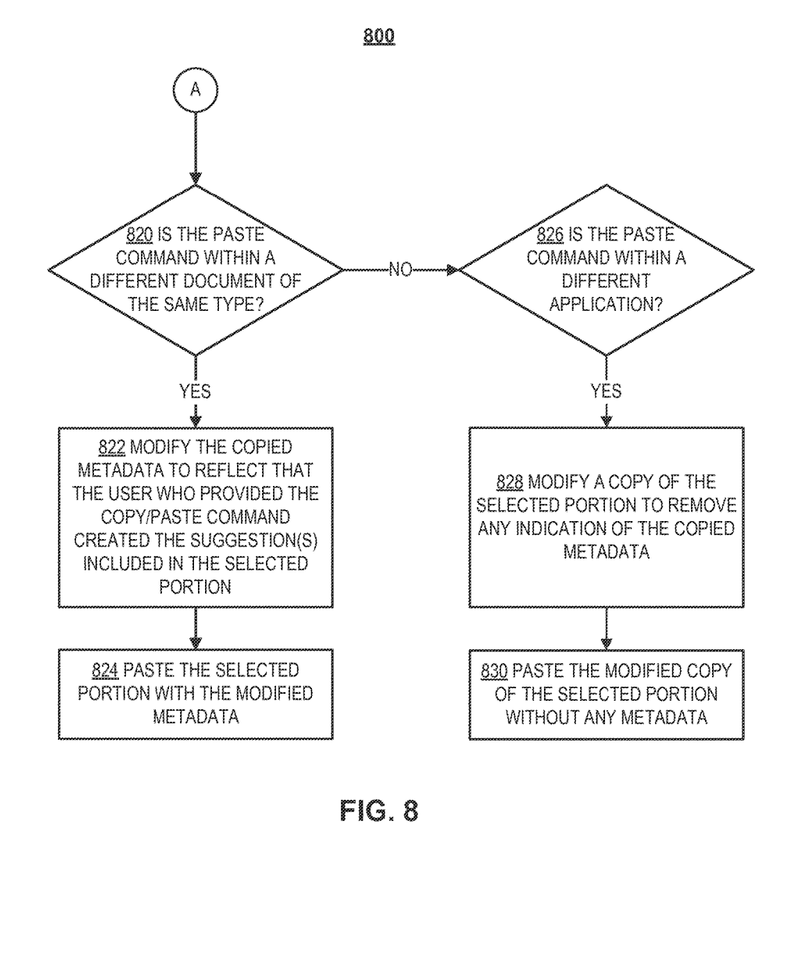
FIG. 8 is a flowchart of a method used by a review manager to manage suggestion metadata to a document when the document's content is pasted outside of the document, according to an illustrative embodiment.

FIG. 8 is an illustrative flow diagram of a process 800 used by the review manager 102 to manage suggestions 105 to a document 106 when a paste command is received outside of the document 106. The process 800 includes the steps of determining whether the paste command is within a different document of the same type as the document 106 (decision block 820). If so, the copied metadata is modified to reflect that the first user (i.e., the user who issued the copy/paste command) created the suggestion(s) included in the selected portion that was copied (step 822), and the selected portion with the modified metadata is pasted to the desired location (step 824). Otherwise, if the paste command is not within a different document of the same type, it is determined whether the paste command occurred within a different application than the application used to open the document 106 (decision block 826). If so, the selected portion is modified to remove any indication of the copied metadata (step 828), and the modified selected portion is pasted without any metadata.

At decision block 820, it is determined whether the paste command has a destination that is in a different document that has the same type as the original document that received the copy command. If the destination is in a different document of the same type, the copied metadata is modified at step 822. In particular, the copied metadata is modified to reflect that the user who provided the copy command at step 704 and the paste command at step 710 is the user who created the suggestion(s) that are included in the selected portion. At step 824, the selected portion is pasted to the destination with the modified metadata. An example of pasted content into a different document than the original document is shown and described in relation to FIG. 5.

Otherwise, if it is determined that the paste command does not have a destination that is in a different document of the same type as the original document at decision block 820, the process 800 proceeds to decision block 826 to determine whether the paste command is within a different application. In particular, a first application may be used to open the document, and the user who issues the copy and paste commands may select to paste the copied content into a second application that is different from the first application. In this case, at step 828, a copy of the selected portion is modified to remove any indication of the copied metadata. In particular, the second application may not be configured to handle suggestions in document content or suggestion metadata. Because the second application may not be able to interpret suggestion metadata, the suggestion metadata is removed from the copied portion of the document. Then, at step 830, the modified copy of the selected portion is pasted to the destination in the second application. No suggestions or suggestion metadata are included in the pasted content, such as is shown and described in relation to FIG. 6.

Figure 9:
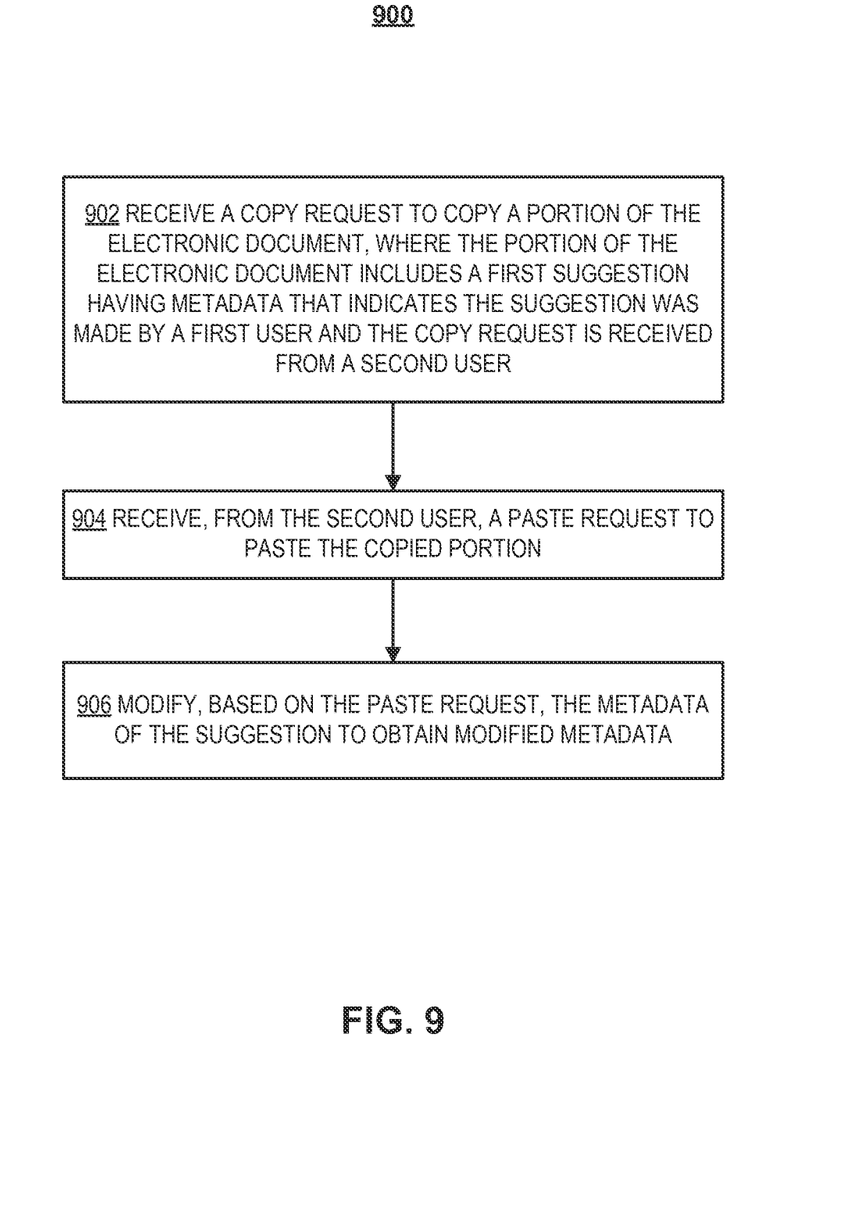
FIG. 9 is a flowchart of a high level method used by a review manager to modify suggestion metadata from a document, according to an illustrative embodiment.

FIG. 9 is an illustrative flow diagram of a high level process 900 used by the review manager 102 to manage suggestions 105 to a document 106. The process 900 includes the steps of receiving a copy request to copy a portion of the electronic document, where the portion of the electronic document includes a first suggestion having metadata that indicates the suggestion was made by a first user and the copy request is received from a second user (step 902), receiving, from the second user, a paste request to paste the copied portion (step 904), and modifying, based on the paste request, the metadata of the first suggestion to obtain modified metadata (step 906).

At step 902, a copy request is received from the second user. The copy request is a request to copy a selected portion of the electronic document. The portion of the electronic document includes a first suggestion having metadata that indicates the suggestion was made by the first user. Even though most of the present disclosure is described in relation to a copy request that is received from the second user, one of ordinary skill in the art will understand that the systems and methods may be also applied to a cut request that is received from the second user, without departing from the scope of the present disclosure. In particular, a cut request for a portion of the document that includes at least one suggestion could lead to the suggestion metadata of the at least one suggestion to be modified to reflect the second user's identity.

At step 904, a paste request is received from the second user. The paste request is a request to paste the copied portion to a particular destination specified in the paste request. The destination may be identified after the paste request is received to determine how to modify the metadata of the first suggestion at step 906.

At step 906, the metadata of the first suggestion is modified, based on the paste request, to obtain modified metadata. As was described in relation to FIGS. 2-8, the manner in which the metadata is modified may depend on a destination for the copied content, where the destination is included in the paste request. In particular, a second suggestion could be created to have the modified metadata, and the second suggestion could be pasted to the destination.

In a first example case, when the destination is in the same electronic document as the document in which the copy request was made, the metadata is modified in the manner shown and described in relation to FIGS. 2, 4, and 7. In particular, the suggestion metadata is modified by adding an indication that the second suggestion is created by the second user, while preserving the indication that the original content of the first suggestion was created by the first user.

In a second example case, when the destination is in a second electronic document having a same type as the first electronic document (in which the copy request was made), the suggestion metadata is modified in the manner shown and described in relation to FIGS. 5 and 8. In particular, the metadata is modified by replacing the indication that the content behind the suggestion was made by the first user with an indication that the suggestion was made by the second user.

In a third example case, when the electronic document is opened using a first application, and the destination is in a second application that is different from the first application, the suggestion metadata is modified in the manner shown and described in relation to FIGS. 6 and 8. In particular, the metadata is removed from the pasted content, such that the pasted content does not include any indication of the suggestion(s). Moreover, as was described above, the suggestions may be removed from the pasted content by accepting the suggestions denoting additions and rejecting the suggestions denoting rejections, to ensure that data is not lost when the content is pasted into the second application.

Figure 10:
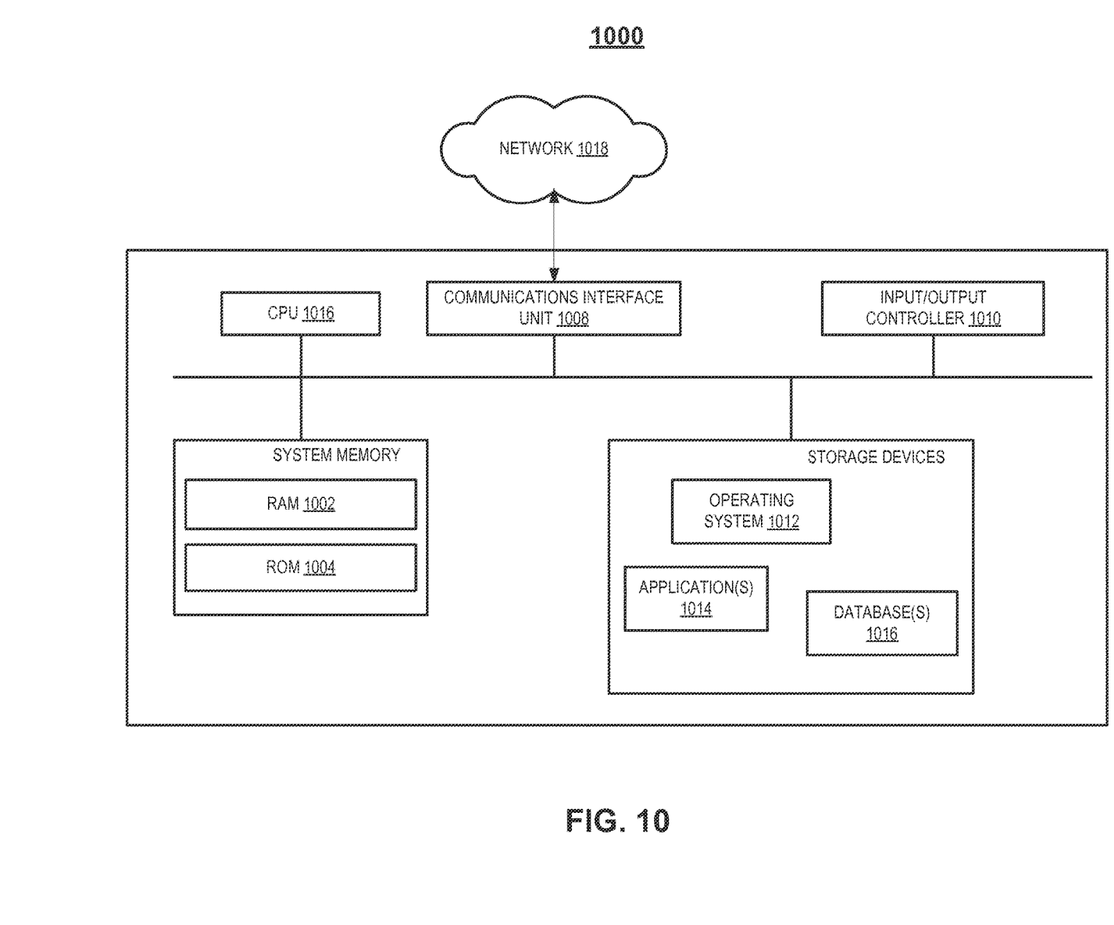
FIG. 10 is a block diagram of a computing device for performing any of the processes described herein, according to an illustrative embodiment.

FIG. 10 is a block diagram of a computing device, such as any of the components of the system of FIG. 1, for performing any of the processes described herein. Each of the components of these systems may be implemented on one or more computing devices 1000. In certain aspects, a plurality of the components of these systems may be included within one computing device 1000. In certain implementations, a component and a storage device may be implemented across several computing devices 1000.

The computing device 1000 comprises at least one communications interface unit, an input/output controller 1010, system memory, and one or more data storage devices. The system memory includes at least one random access memory (RAM 1002) and at least one read-only memory (ROM 1004). All of these elements are in communication with a central processing unit (CPU 1006) to facilitate the operation of the computing device 1000. The computing device 1000 may be configured in many different ways. For example, the computing device 1000 may be a conventional standalone computer or alternatively, the functions of computing device 1000 may be distributed across multiple computer systems and architectures. In FIG. 10, the computing device 1000 is linked, via network or local network, to other servers or systems.

The computing device 1000 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 1008 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 1006 comprises a processor, such as one or more conventional microprocessors and one or more supplementary co-processors such as math co-processors for offloading workload from the CPU 1006. The CPU 1006 is in communication with the communications interface unit 1008 and the input/output controller 1010, through which the CPU 1006 communicates with other devices such as other servers, user terminals, or devices. The communications interface unit 1008 and the input/output controller 1010 may include multiple communication channels for simultaneous communication with, for example, other processors, servers or client terminals.

The CPU 1006 is also in communication with the data storage device. The data storage device may comprise an appropriate combination of magnetic, optical or semiconductor memory, and may include, for example, RAM 1002, ROM 1004, flash drive, an optical disc such as a compact disc or a hard disk or drive. The CPU 1006 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 1006 may be connected to the data storage device via the communications interface unit 1008. The CPU 1006 may be configured to perform one or more particular processing functions.

The data storage device may store, for example, (i) an operating system 1012 for the computing device 1000; (ii) one or more applications 1014 (e.g., computer program code or a computer program product) adapted to direct the CPU 1006 in accordance with the systems and methods described here, and particularly in accordance with the processes described in detail with regard to the CPU 1006; or (iii) database(s) 1016 adapted to store information that may be utilized to store information required by the program.

The operating system 1012 and applications 1014 may be stored, for example, in a compressed, an uncompiled and an encrypted format, and may include computer program code. The instructions of the program may be read into a main memory of the processor from a computer-readable medium other than the data storage device, such as from the ROM 1004 or from the RAM 1002. While execution of sequences of instructions in the program causes the CPU 1006 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to any of the processes as described herein. The program also may include program elements such as an operating system 1012, a database management system and "device drivers" that allow the processor to interface with computer peripheral devices (e.g., a video display, a keyboard, a computer mouse, etc.) via the input/output controller 1010.

The term "computer-readable medium" as used herein refers to any non-transitory medium that provides or participates in providing instructions to the processor of the computing device 1000 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 1006 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 1000 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

What is claimed is:

1. A method for modifying suggestion metadata in an electronic document, the method comprising:
   receiving, by at least one computer processor, a copy request to copy a portion of the electronic document, wherein the portion of the electronic document includes a first suggestion having first metadata that indicates the first suggestion was made by a first user, wherein the first suggestion comprises a change to the portion of the document, and wherein the copy request is initiated by a second user;
   receiving a paste request to paste the copied portion, wherein the paste request is initiated by the second user; and
   generating, based on the paste request, second metadata that identifies the first user as a user who made the first suggestion and the second user as a user who initiated the paste request,
   wherein generating the second metadata comprises modifying the first metadata indicating that the first suggestion was made by the first user,
   wherein the first suggestion is (i) accepted in the copied portion to obtain a pasted portion, responsive to the first suggestion comprising the change that is an addition, or (ii) rejected in the copied portion to obtain the pasted portion, responsive to the first suggestion comprising the change that is a deletion, and
   wherein as the electronic document is displayed with the pasted portion, the second metadata is concurrently presented in association with the pasted portion in the electronic document.

2. The method of claim 1, further comprising:
   creating a second suggestion having the second metadata, the second suggestion corresponding to the first suggestion included in the pasted portion; and
   pasting the second suggestion to a destination indicated in the paste request.

3. The method of claim 1, further comprising determining a destination indicated in the paste request, wherein the first metadata of the first suggestion is modified based on the destination.

4. The method of claim 3, wherein when the destination is in the electronic document, a version of the first metadata is modified by adding an indication that the second suggestion is created by the second user.

5. The method of claim 4, wherein the second metadata includes an indication that content of the first suggestion was originally created by the first user.

6. The method of claim 3, wherein the electronic document is a first electronic document, and when the destination is in a second electronic document having a same type as the first electronic document, the first metadata is modified by replacing the indication that the first suggestion was made by the first user with an indication that the first suggestion was made by the second user.

7. The method of claim 3, wherein a first application is used to open the electronic document, and when the destination is in a second application that is different from the first application, the first metadata is modified by removing the first metadata.

8. The method of claim 7, further comprising pasting the portion of the electronic document to a destination indicated in the paste request, wherein the pasted portion corresponds to the copied portion without the first suggestion.

9. A system for modifying suggestion metadata in an electronic document, the system comprising:
a receiver processor configured to:
receive a copy request to copy a portion of the electronic document, wherein the portion of the electronic document includes a first suggestion having first metadata that indicates the first suggestion was made by a first user, wherein the first suggestion comprises a change to the portion of the document, and wherein the copy request is initiated by a second user; and
receive a paste request to paste the copied portion, wherein the paste request is initiated by the second user; and
an editing engine configured to generate, based on the paste request, second metadata that identifies the first user as a user who made the first suggestion and the second user as a user who initiated the paste request, wherein generating the second metadata comprises modifying the first metadata indicating that the first suggestion was made by the first user,
wherein the first suggestion is (i) accepted in the copied portion to obtain a pasted portion, responsive to the first suggestion comprising the change that is an addition, or (ii) rejected in the copied portion to obtain the pasted portion, responsive to the first suggestion comprising the change that is a deletion, and
wherein as the electronic document is displayed with the pasted portion, the second metadata is concurrently presented in association with the pasted portion in the electronic document.

10. The system of claim 9, wherein the editing engine is further configured to:
create a second suggestion having the second metadata, the second suggestion corresponding to the first suggestion included in the pasted portion; and
paste the second suggestion to a destination indicated in the paste request.

11. The system of claim 9, wherein the editing engine is further configured to determine a destination indicated in the paste request, and modify the first metadata of the first suggestion based on the destination.

12. The system of claim 11, wherein when the destination is in the electronic document, a version of the first metadata is modified by adding an indication that the second suggestion is created by the second user.

13. The system of claim 12, wherein the second metadata includes an indication that content of the first suggestion was originally created by the first user.

14. The system of claim 11, wherein the electronic document is a first electronic document, and when the destination is in a second electronic document having a same type as the first electronic document, the first metadata is modified by replacing the indication that the first suggestion was made by the first user with an indication that the first suggestion was made by the second user.

15. The system of claim 11, wherein a first application is used to open the electronic document, and when the destination is in a second application that is different from the first application, the first metadata is modified by removing the first metadata.

16. The system of claim 15, wherein the editing engine is further configured to paste the portion of the electronic document to a destination indicated in the paste request, and the pasted portion corresponds to the copied portion without the first suggestion.

17. A method for modifying suggestion metadata in an electronic document, the method comprising:
receiving, by at least one computer processor, a cut request to cut a portion of the electronic document, wherein the portion of the electronic document includes a first suggestion having first metadata that indicates the first suggestion was made by a first user, wherein the first suggestion comprises a change to the portion of the document, and wherein the cut request is initiated by a second user;
receiving a paste request to paste the cut portion, wherein the paste request is initiated by the second user; and
generating, based on the paste request, second metadata that identifies the first user as a user who made the first suggestion and the second user as a user who initiated the paste request by modifying the first metadata indicating that the first suggestion was made by the first user,
wherein the first suggestion is (i) accepted in the copied portion to obtain a pasted portion, responsive to the first suggestion comprising the change that is an addition, or (ii) rejected in the copied portion to obtain the pasted portion, responsive to the first suggestion comprising the change that is a deletion, and
wherein as the electronic document is displayed with the pasted portion, the second metadata is concurrently presented in association with the pasted portion in the electronic document.

18. The method of claim 17, further comprising:
determining a destination indicated in the paste request, wherein a version of the first metadata of the suggestion is modified based on the destination;
creating a second suggestion having the second metadata, the second suggestion corresponding to the first suggestion included in the pasted portion; and
pasting the second suggestion to the destination indicated in the paste request.

* * * * *